United States Patent [19]

Morgenthaler et al.

[11] Patent Number: 4,595,513

[45] Date of Patent: Jun. 17, 1986

[54] OIL BASE WELL TREATING FLUIDS THICKENED BY BLOCK COPOLYMERS

[75] Inventors: Lee N. Morgenthaler, Houston; Wayne J. Mikols, Katy, both of Tex.

[73] Assignee: Shell Oil Company, Houston, Tex.

[21] Appl. No.: 639,752

[22] Filed: Aug. 10, 1984

[51] Int. Cl.$^4$ .................... E21B 43/26; E21B 43/04
[52] U.S. Cl. ..................... 252/8.55 R; 166/278; 166/283; 524/534
[58] Field of Search ............ 252/8.55 R, 8.5 M; 524/534; 525/314; 166/308, 283, 278

[56] References Cited

U.S. PATENT DOCUMENTS

| | | | |
|---|---|---|---|
| 2,596,844 | 5/1952 | Clark | 252/8.55 X |
| 2,966,401 | 12/1960 | Myerholtz | 252/8.55 X |
| 3,333,024 | 7/1967 | Haefele et al. | 524/534 X |
| 3,351,079 | 11/1967 | Gibson | 252/8.55 X |
| 3,416,899 | 12/1968 | Schiff | 252/8.55 X |
| 3,910,856 | 10/1975 | Kruka et al. | 524/534 X |
| 4,156,673 | 5/1979 | Eckert | 524/534 |

*Primary Examiner*—Herbert B. Guynn

[57] ABSTRACT

Oil based well treating fluids comprise liquid mixtures of aliphatic and aromatic hydrocarbons containing aromatic hydrocarbons, polymeric materials inclusive of at least one block copolymer and polymer crosslinking agents, with the kinds and amounts of those materials tailored to the properties of the wells and the well treatment designs.

12 Claims, 3 Drawing Figures

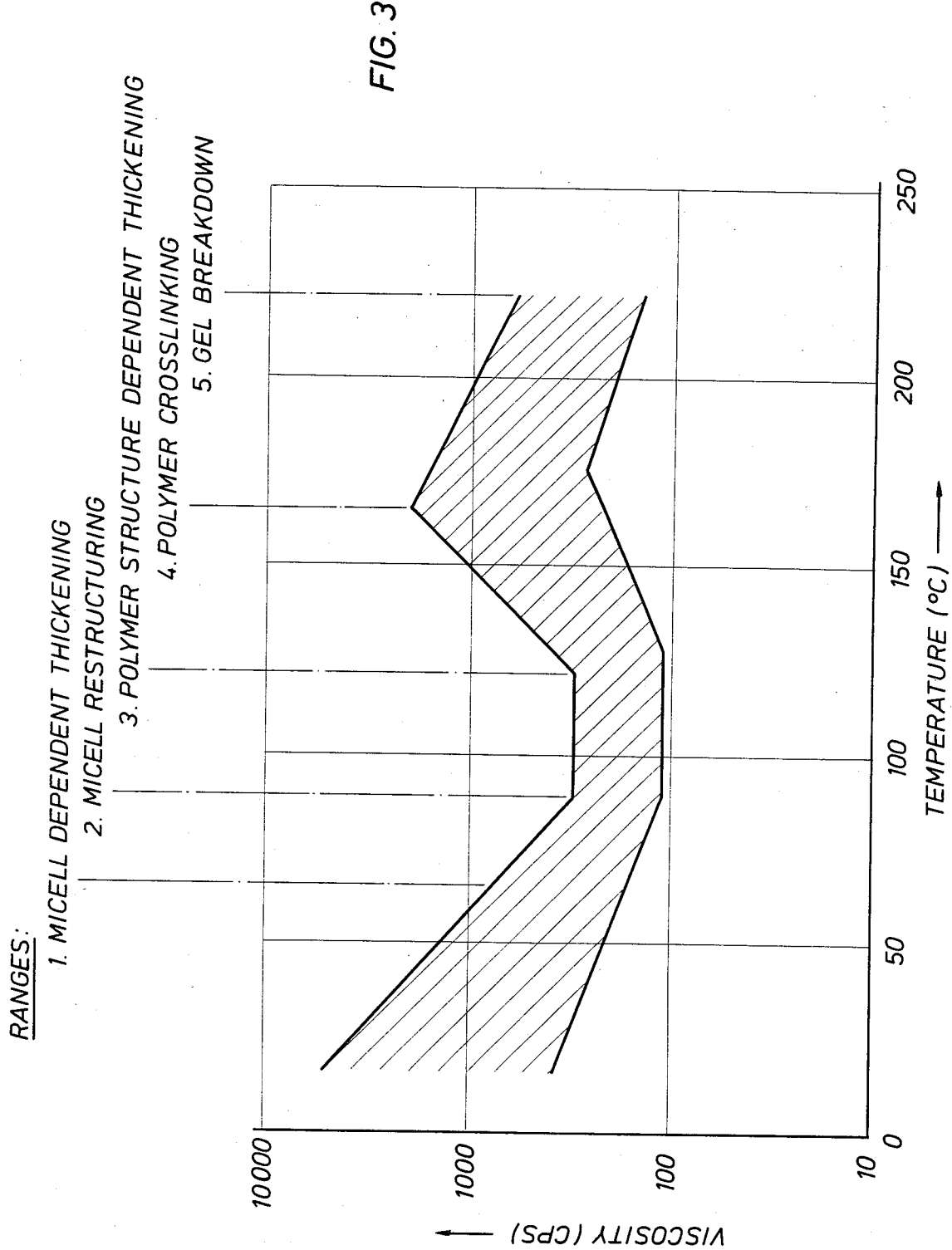

OIL BASE WELL TREATING FLUIDS THICKENED BY BLOCK COPOLYMERS

BACKGROUND OF THE INVENTION

This invention relates to oil based well treating fluids and methods of using them; particularly for treatments involving transporting particles such as sand, gravel or fracture propping particles into openings in or around the borehole of a well. More particularly, the invention relates to a well treating fluid comprising a liquid mixture of aromatic and aliphatic hydrocarbons, polymers inclusive of at least one arene/diene block copolymer and at least one free radicalproducing polymer crosslinking agent.

In the text book "Block Copolymers" by D. C. Alport and W. H. James, John Wiley & Sons, 1973, on page 18 of the introduction, it is stated that, "Although a full understanding of the behavior of block polymers is not yet available, sufficient evidence has now been collected to draw conclusions which are general to all block copolymers in which dissimilar blocks are attached end to end. Several important classes of block copolymers now have significant commercial applications as elastomers, fibers, surfactants, adhesive and thermal plastics and the useful applications are steadily growing".

Numerous types of block copolymers have been described in the U.S. patents such as the following: U.S. Pat. No. 3,149,182, by L. M. Porter describes producing block copolymers by polymerizing a polyethylenically unsaturated hydrocarbon alkenyl-substituted aromatic hydrocarbons or alkenyl-substituted heterocyclic compound until there is no more unpolymerized monomer in the reaction mixture, then adding a dissimilar monomer of such a group and continuing the reaction. U.S. Pat. No. 3,333,024, by W. R. Haefele, C. A. Dallas and M. A. Diesz, describes similar block copolymers in which a portion of the unsaturation has been removed by hydrogenation to improve the thermal and oxidative stability of the polymers. U.S. Pat. No. 3,595,942 by M. W. Wald and M. G. Quam, describes selectively hydrogenated block copolymers which are solid at temperatures which liquefy block copolymers which are more or less hydrogenated. U.S. Pat. No. 3,682,187, by E. V. Seymour, S. Davidson and W. R. Haefell, describes block copolymers which are effective in reducing friction caused by flowing hydrocarbon liquids within conduits. U.S. Pat. No. 4,111,895, by W. P. Gergen and S. Davidson, describes the capability of block copolymers for stabilizing blends of dissimilar polymers. U.S. Pat. No. 4,116,917, by R. J. A. Eckert, describes the suitability of hydrogenated star block copolymers for altering the viscosity of liquid hydrocarbons. U.S. Pat. No. 4,120,915, by L. M. Fodor and A. G. Kitchen, describes styrene/conjugated-diene block copolymer compositions containing antioxidants for improving their thermal stability. The disclosures of these patents are incorporated herein by reference.

Oil based well treating fluids such as fracturing fluids are described in numerous United States patents such as the following: U.S. Pat. No. 2,794,779, filed about 30 years ago, (a) describes the need for a fracturing fluid to be thin enough to be readily pumped, yet thick enough to have a low fluid loss into the reservoir rock, and capable of spontaneously becoming thin enough for easy removal and (b) recommends use of aluminum salts of two ethylhexoic acids as thickening agents. U.S. Pat. No. 2,914,476 discloses tall oil soaps as thickening agents for oil based fracturing fluids. U.S. Pat. No. 2,946,748 discloses soaps of aliphatic acids containing more than 20 carbon atoms as thickening agents for oil based fracturing fluids. U.S. Pat. No. 2,966,457 discloses adding inorganic ammonium salts to oil based fluids along with alkali metal soap gelling agents. U.S. Pat. No. 2,988,505 recommends fracturing fluids comprising petroleum oils containing sparingly oil-soluble phosphates, sulphates, or sulfonates and asphaltenes as thickening agents. U.S. Pat. No. 2,997,441 suggests mixtures of calcium tallate soaps and calcium sulphates as thickening agents. U.S. Pat. No. 3,207,693 suggests calcium salts soap complexes mixed with small proportions of polyacrylic acids as thickening agents. U.S. Pat. No. 3,409,548 recommends cross-linked copolymers of alpha-olefins and sulfur dioxide as thickening agents. U.S. Pat. No. 3,466,242 recommends silica flour coated with ethylene-propylene copolymers as a thickening agent. U.S. Pat. Nos. 3,757,864; 3,990,978 and 4,200,539 relate to using aluminum soaps of partially esterified phosphoric acid as thickening agents. U.S. Pat. No. 4,200,540 suggests using aluminum salts of organic esters of phosphoric acid by dissolving one portion in the hydrocarbon liquid, as an initial thickening agent, and dispersing additional undissolved portions within the solution to provide a suspension having a viscosity which is initially relatively low but increases when the fluid is heated to a temperature at which a suspended aluminum salt dissolves, in order to extend the effective operating range to temperatures above about 200° F.

SUMMARY OF THE INVENTION

The present invention relates to an oil based well treating fluid having a viscosity which remains high or increases as the temperature of the fluid approaches that of the reservoir and later decreases to a relatively low viscosity after a selected time at the reservoir temperature. The well treating fluid of the invention comprises a liquid mixture of aliphatic and aromatic hydrocarbons containing a solution or dispersion of (1) at least one polymer inclusive of at least one block copolymer in which at least one elastomeric block portion is connected to at least one relatively short glassy polymer block portion and (2) at least one free-radical-forming polymer crosslinking agent which is capable of crosslinking at least one polymer contained within the liquid mixture at a temperature between the well site surface temperature and the reservoir temperature. In said liquid mixture, the kind and amount of the aromatic hydrocarbons, polymers and polymer crosslinking agent are arranged, relative to the reservoir temperature and the well treatment design, so that, (a) at a surface location at the well site, the liquid mixture is pumpable but has a relatively low fluid loss with respect to the permeability of the reservoir and the well treatment designed length of contact between the reservoir and the well treating fluid and, (b) at subsurface locations within the well, the viscosity of the liquid mixture is, or becomes, high enough to suspend fracture propping particles and/or sand or gravel packing particles, and (c) after remaining at the reservoir temperature for a selected time, the viscosity of the liquid becomes low enough to facilitate the removal of it from the reservoir.

BRIEF DESCRIPTION OF THE DRAWINGS

FIG. 3. is a schematic illustration of ranges of viscosities which are readily attainable at various temperatures with well treating fluid compositions of the present invention.

DESCRIPTION OF THE INVENTION

Figure 1:
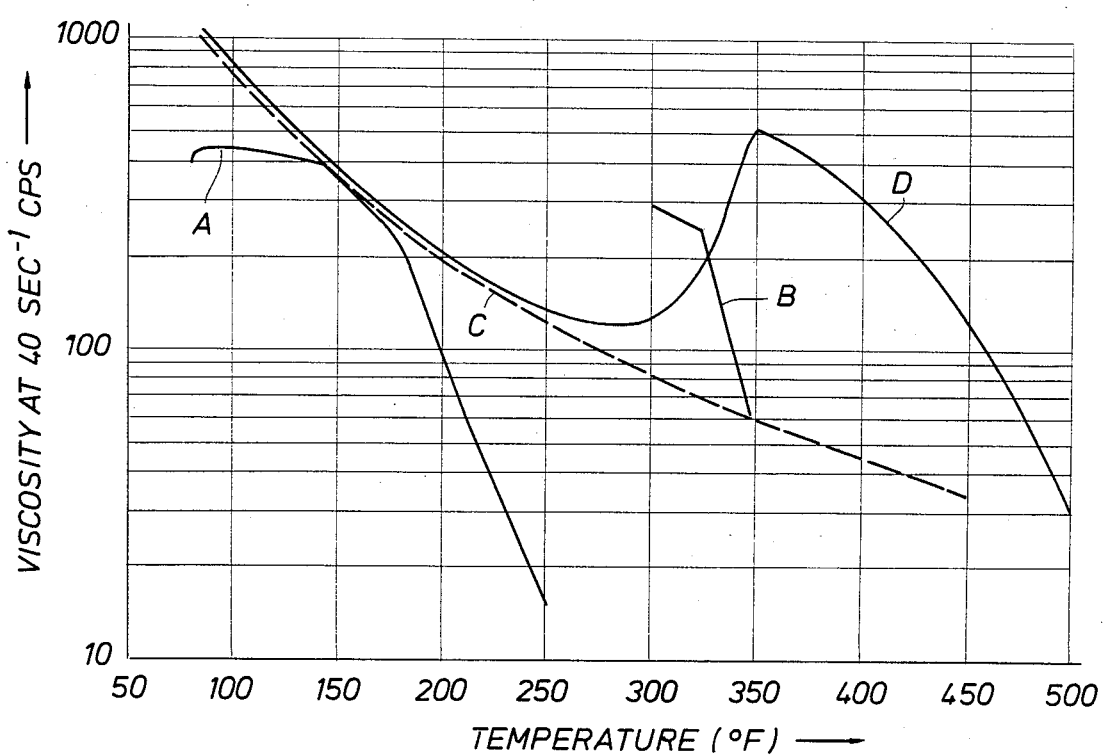
FIG. 1 is a plot of viscosity versus temperature for a series of fracture fluid compositions.

Persons skilled in the art of well treating operations (such as fracturing or gravel packing operations) in which liquids are pumped into wells to create fractures and/or transport masses of granular solids into voids in subterranean earth formations, have developed significant amounts of information on designing the treatment procedures and fluids to be used. For example, algorithms are available for calculating amounts of liquid and/or solid particles, the amount of fluid loss which is desirable, the amount of friction loss which is tolerable and/or the flowing or static particle-suspending capabilities of such fluids, the sizes of particles to be used, the time periods during which fractures should be allowed to close on propping particles or liquids removed from sand or gravel packs, and the like, which should be used for particular resservoirs and particular operations. In general, it is recognized that a well treating fluid should have (a) a pumpable viscosity but a sufficiently low fluid loss against the reservoir rock, (b) should maintain or increase its viscosity, when it is flowed into the well and its temperature approaches or attains that of the reservoir, in order to provide a viscosity sufficient for transporting the particles while the fluid is flowing and/or suspending the particles while the fluid is static and (c) should, within a reasonable time at the reservoir temperature, decrease its viscosity, to provide for an easy removal of its liquid components.

Most liquids become less and less viscous as their temperature is increased. In most wells the reservoir temperature is significantly greater than the well site surface temperature. Therefore, in order to avoid a significant heat-induced reduction of viscosity, as the solution temperature approaches the reservoir temperature, a well treating fluid should contain dissolved and/or dispersed components which are capable of providing an increase of viscosity which is at least sufficient to counteract the heat-induced loss of viscosity.

Applicants have discovered that, in concentrations suitable for use in well treating fluids based on liquid hydrocarbons, the viscosity with temperature properties of the presently specified types of block copolymers tend to maintain the fluid viscosity at a substantially constant viscosity at increasing temperatures, as well as being capable of increasing the viscosity due to a crosslinking of polymers at reservoir temperatures apt to be encountered in a well treating operation. Those viscosity properties, along with the capability of block copolymers to reduce friction during flow and/or to compatibilize mixtures of different polymers, cause the presently described block copolymers to be particularly advantageous thickening agents for oil based well treating fluids. The viscosity with temperature properties of oil based fluids containing them can readily be adjusted to provide desirable reservoir and job design-tailored properties for use in reservoirs having temperatures ranging from about well site surface temperatures to temperatures which may be well above those at which the conventional oil or water based well treating fluids can be used, for example, up to 600° F. or more.

FIG. 1 shows plots of viscosity versus temperature for different liquid fracturing fluids. In each case, each fracturing fluid was heated to each of a series of temperatures at pressures sufficient to keep the fluid in the liquid phase. The viscosities were measured with a commercially available Couette viscometer.

The Curve A fluid was a conventional oil based fracturing fluid thickened with an aluminum salt of an alkyl phosphate ester. The Curve A fluid is available from Halliburton Company. The data for Curve A was taken from U.S. Pat. No. 4,200,540.

The Curve B fluid was a conventional water based fracturing fluid containing a crosslinked water-soluble cellulosic polymer crosslinked with titanium. The Curve B type of fluid is available from the Western Company of North America. The data for Curve B was taken from SPE Paper 11794.

The Curve C fluid was a solution of a block copolymer in diesel oil having a flashpoint of 155° F., containing 60 percent saturated hydrocarbons, 34 percent aromatic hydrocarbons and 6 percent volatile hydrocarbons. The diesel oil solution contained about 12 percent by weight of an SBS block copolymer of styrene and butadiene containing approximately 10 percent styrene and having a molecular weight on the order of 200,000.

The Curve D fluid was a well treating fluid of the present invention. It contained a diesel oil/block copolymer solution of the composition used for Curve C to which was added 2000 parts per million polymer crosslinking initiator 2,5-dimethyl-2,5di (t-butylperoxy)-hexane. The viscosity versus temperature properties of the Curve D fracturing fluid indicates it to be well suited for treating a well having a bottom hole temperature of about 350° to 450° F. It had an initial viscosity similar to that of the Curve C fluid, and as temperature increased to about 225° F. its viscosity decrease was like that of the Curve C fluid. But, as the temperature rose between about 250° F. to 350° F., the onset of polymer crosslinking reactions caused a significant rise in the viscosity. Then, from about 350° F. to 500° F., the viscosity was declined relatively rapidly due to thermal degradation caused by the additional time and temperature exposure. As is known to those skilled in the art, a similar degradation would occur if the Curve D fluid was merely maintained at a reservoir temperature such as 350° F.

Figure 2:
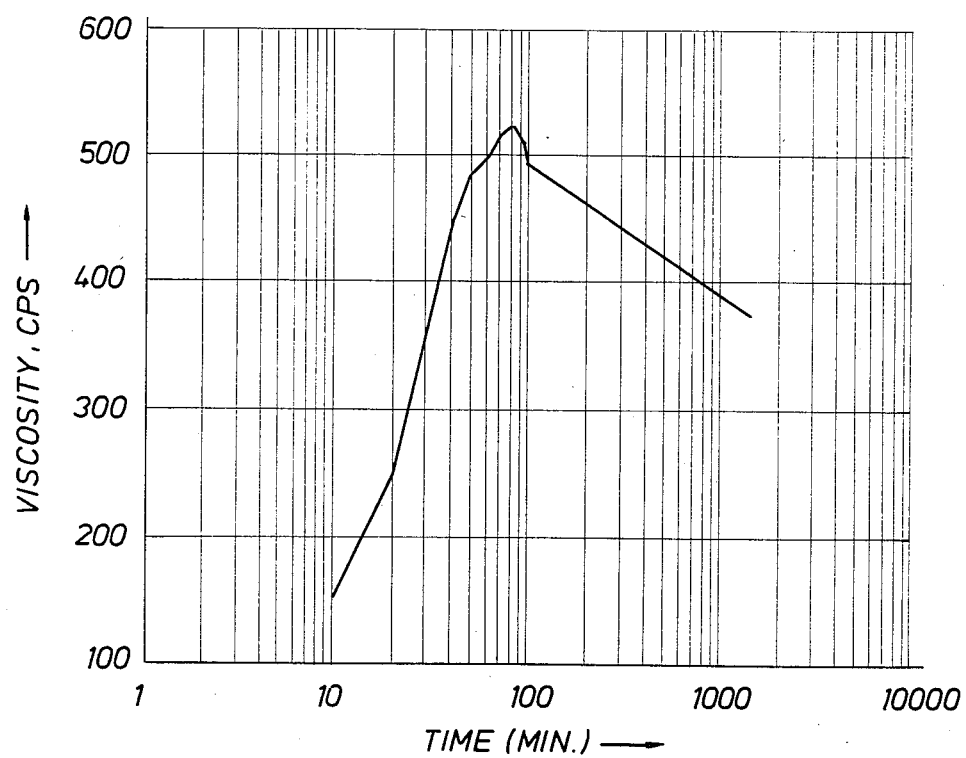
FIG. 2 is a plot of the viscosity with time at 350° F. of an oil based well treating fluid of the present invention.

FIG. 2 shows the time dependent thickening and thinning behavior of an example well treating fluid of the present invention (i.e., the Curve D fluid described regarding FIG. 1) when the solution is maintained at a temperature of 350° F. The viscosity increased from about 50 to more than 500 centipoises in less than two hours. During the next 15 hours the viscosity was declining at a rate of more than about 10 centipoises per hour.

FIG. 3 is a schematic graph of viscosity versus temperature for well treating fluids of the present invention. As indicated on the Figure, when such solutions are exposed to temperatures ranging from about 20° to 80° C., their viscosities can be arranged to decrease with temperature and exhibit a pseudoplastic flow by being shear-thinning but not shear-degrading. Such a behavior can be provided by the miscelldependent and/or structure-dependent behavior of a solution containing at least one block copolymer. In the vicinity of about 100° C., such solutions behave as though the micell restructuring occurs. For example, the styrene end blocks of the SBS block copolymer of the Curve D solution approach a glass transition point at which the micells tend to restructure. At temperatures in the vicinity of 120° to 160° C. the cross-linking of the polymers causes a significant increase in the viscosity. And, subsequently, the viscosity falls due to the maintaining of the polymers at a relatively high temperature.

In general, as indicated by the first range of temperature/viscosity correlations indicated of FIG. 3, the viscosities of the present well treating solutions can initially be adjusted to a relatively wide range of initial viscosity. Such a range can extend from less than about 400 to more than 10,000 centipoise.

In an oil based solution containing some aromatic hydrocarbons, the initial viscosities are particularly responsive to types and amounts of dissolved or dispersed polymers. In accordance with the present invention such polymers include arene/diene type block copolymers or their mixtures with one or more solution-compatible thermoplastic polymers. As used herein the term "type of polymers" refers to the molecular weight, type of chain structure and bonding, amount of chain-branching, and the like, of the polymer.

The block polymers utilized in the present invention can be hydrogenated or non-hydrogenated and can contain relatively few or many double bonds in their diene or arene components. Such polymers having relatively few double bonds can be formed by block copolymerizing monomers (such as butadiene and styrene) and then hydrogenating the products or can be formed by substantially any different synthesis route which produces products that are at least substantially equivalent to those capable of being produced by copolymerizing the unsaturated monomers then hydrogenating the block copolymers. In general, the amount and type of polymers which can be incorporated in order to increase the viscosity of the solution are affected by the kinds of hydrocarbons and the ratio of aromatic to aliphatic hydrocarbons and/or proportions of volatile hydrocarbons which are present in the hydrocarbon solution.

In the second range of temperatures/viscosity correlations shown on FIG. 3, the solution components can be arranged so that, due to a temperature increase to about 70° to 130° C., where micell restructuring is apt to occur, the heat-induced reduction in the initial viscosity may result in a viscosity between about 100 to 500 centipoise.

In the ranges 2 and 3 on FIG. 3, the solution temperature is approaching or reaching a glass transition temperature for the arene in blocks of block copolymers. As known to those skilled in the art, the glass transition temperature is the temperature at which the shear modulus of the polymer, at low stress, shows a catastrophic drop in magnitude. The temperature boundaries of such ranges, in which micell thickening and/or polymer structure-dependent thickening strongly affect the viscosity, can be extended by including block copolymers with end block structures other than styrene and/or thermoplastic polymers with higher or lower glass transition temperatures. In addition, the temperature boundaries and/or the solution viscosity can be adjusted by including within the solution crosslinking agents which become effective at such temperatures.

The fourth range shown on FIG. 3 relates to the magnitude of the viscosity increase which can be provided by crosslinking polymer chains within the solution. As indicated, its boundaries can be varied from about 100, or less, to about 1500, or more, centipoise.

As known to those skilled in the art, numerous types of compounds can suitably be used as the free radical-forming polymer crosslinking agents. The crosslinking agents used in the present invention can include azo compounds, alkyl or acyl peroxides or hydroperoxides, ketoperoxides, peroxy esters, peroxy carbonates, and peroxy ketals. Such compounds vary in respect to the temperature at which their reaction is initiated and becomes extensive. Where desirable, one of more of crosslinking agents can be utilized to initiate crosslinking at substantially any temperature between the well site surface temperature and the reservoir temperature. The crosslinking reaction can be started soon enough to cause the well treating fluid viscosity to remain substantially constant while the solution is being heated to the reservoir temperature (e.g., during its downward passage through the wellbore) and/or its flowing or static residence time at the reservoir temperature. Examples of suitable crosslinking agents include alkyl peroxides, dialkyl peroxides, hydroperoxides, acyl peroxides and peroxy ketals. Particularly suitable crosslinking agents are : 1,1-bis(t-butylperoxy)-3,3,5-trimethylcyclohexane; benzoyl peroxide; 2,5-dimethylhexane-2,5-dihydroperoxide; and 2,5-dimethyl-2,5-(t-butylperoxy)-hexane.

The fifth range shown on FIG. 3 relates to the breaking down of the gel formed by the polymer crosslinking when the polymer is heated to a relatively high reservoir temperature for a relatively long time. As indicated by FIGS. 1 and 2, when a preferred type of solution of the present invention is heated to a reservoir temperature of about 350° F. (177° C.) the gel breakdown decreased the solution viscosity at a rate of about 10 centipoise per hour. The rate at which the viscosity is reduced by a gel breakdown can readily be adjusted by, for example, using more crosslinking agent to increase the extent to which the viscosity at the reservoir temperature is due to a gel formation or including more relatively temperature stable block copolymers and/or similarly stable solution-compatible polymers within the solution.

Solution-compatible polymers which can suitably be included in the well treating inventions of the present invention can be substantially any which are capable of being substantially completely dissolved in the block copolymer and polymer crosslinking agent-containing solution at the reservoir temperature and are not adversely affected by the crosslinking reactions of the crosslinking agent. Such solution compatible polymers can comprise, polyolefins, thermopolastic polyesters, poly(aryl esters), poly(aryl sulfones), polyamides, acetal resins, thermoplastic polyurethanes, halogenated thermoplastics, nitrile barrier resins, etc., such as those exemplified in U.S. Pat. No. 4,111,895.

Where desirable, at least some of the block copolymers and/or solution compatible polymers contained in the oil based well treating solution as it is flowed into the well can comprise small undissolved solid particles or liquid droplets. It is preferable that such particles (or droplets) be homogeneously dispersed and be sufficiently soluble in the oil based liquid to become substantially completely dissolved in that liquid when the temperature of the liquid reaches the reservoir temperature.

What is claimed is:

1. An oil based well treating fluid, comprising:

a liquid mixture of aliphatic and aromatic hydrocarbons containing (1) at least one dissolved or dispersed polymer of the group consisting of at least one arene/diene block copolymer and mixtures of at least one arene/diene block copolymer with one or more solution-compatible thermoplastic polymers, with said block copolymers having at least one elastomeric block portion and one or more thermoplastic block portions and (2) at least one free-radical-forming polymer crosslinking agent of the group consisting of alkyl peroxides, dialkyl peroxides, hydroperoxides, acyl peroxides and peroxy ketals capable of crosslinking at least one of said dissolved or dispersed polymers within the liquid mixture at a temperature between the surface temperature at the well side and the reservoir temperature; and within said liquid mixture, kinds and amounts of aromatic hydrocarbons, polymeric materials and types and amounts of polymer crosslinking agents which are correlated relative to the reservoir temperature and the well treatment design so that (a) at surface locations, the viscosity of the liquid mixture is low enough for pumpability but high enough for a low fluid loss into the reservoir, rocks, and (b) when the temperature of the liquid mixture is increased, the viscosity is, or becomes, high enough to suspend solid particles and, (c) when the liquid is maintained at reservoir temperature for a selected time, the viscosity becomes low enough for an effective removal of the liquid.

2. The fluid of claim 1 in which at least a significant proportion of the solid particles which said liquid mixture is capable of suspending comprise fracture propping particles which are included within the mixture when it is flowed into the well.

3. The fluid of claim 1 in which said block copolymer comprises an SBS tripolymer of styrene and butadiene.

4. The fluid of claim 1 in which said liquid mixture contains both a block copolymer and a solution compatible polymer of a different type.

5. The fluid of claim 1 in which said crosslinking agent is an alkylhydroperoxide.

6. The fluid of claim 1 in which said crosslinking agent is a mixture containing at least two such agents that react at different temperatures.

7. A well treating process comprising:

dissolving or dispersing within a liquid mixture of aliphatic and aromatic hydrocarbons (1) at least one polymeric material of the group consisting of arene/diene type block copolymers and mixtures of arene/diene block copolymers with one or more solution-compatible thermoplastic polymers, with said block copolymers containing at least one elastomeric block portion connected to at least one thermoplastic block portion and (2) at least one free-radical-forming polymer crosslinking agent of the group consisting of alkyl peroxides, dialkyl peroxides, hydroperoxides, acyl peroxides and peroxy ketal, capable of crosslinking at least one of said dissolved or dispersed polymeric materials within the liquid mixture at a temperature between the surface temperature at the well site and the reservoir temperature; and arranging the aromatic hydrocarbon content of the liquid mixture and the kinds and amounts of said polymeric materials and polymer crosslinking agents in the liquid mixture relative to the temperature and well treating operation design so that, at a well site surface location, the liquid mixture is pumpable but capable of exhibiting low fluid loss against the reservoir formation, and, at a subsurface location, the viscosity of the liquid mixture is, or becomes, high enough to be capable of suspending solid particles but, when the liquid mixture is maintained for the well treatment-designed time at the reservoir temperature, decreases to a viscosity low enough for an easy removal of the injected liquid; and flowing the so-arranged liquid mixture into the well and into contact with said reservoir formation.

8. The process of claim 7 in which fracture propping particles are suspended in at least a portion of the liquid mixture flowed into the well.

9. The process of claim 7 in which gravel packing particles are suspended in at least a portion of the liquid mixture flowed into the well.

10. The process of claim 7 in which said liquid mixture contains both a block copolymer and a solution compatible polymer of a different type.

11. The process of claim 7 in which said crosslinking agent is an alkylhydroperoxide.

12. The process of claim 7 in which said crosslinking agent is a mixture containing at least two such agents that react at different temperatures.

* * * * *